April 21, 1959     W. J. KESSLER ET AL     2,883,663
MEANS FOR DIRECTION FINDING AND RANGING ON ATMOSPHERICS
Filed March 11, 1955     3 Sheets-Sheet 1

FIG. I

INVENTORS,
WILLIAM J. KESSLER
SYDNEY E. SMITH
SAMUEL P. HERSPERGER JR
BY
Harry M. Saragovitz
ATTORNEY INVENTORS,
WILLIAM J. KESSLER
SYDNEY E. SMITH
SAMUEL P. HERSPERGER JR.
BY
Harry M. Saragovitz
ATTORNEY.

United States Patent Office 2,883,663
Patented Apr. 21, 1959

2,883,663

MEANS FOR DIRECTION FINDING AND RANGING ON ATMOSPHERICS

William J. Kessler, Gainesville, and Sydney E. Smith, Eau Gallie, Fla., and Samuel P. Hersperger, Jr., Fort Worth, Tex., assignors to the United States of America as represented by the Secretary of the Army Application March 11, 1955, Serial No. 493,842

2 Claims. (Cl. 343—123)

The present invention relates, generally, to means for detecting and indicating the direction of atmospheric discharges or "sferics." More specifically, it relates to the development of a sferics direction finder immune to multipath propagational phenomena through the applications of pulse resolution and brilliance modulation to provide bearing indications on direct ground-wave energy components only.

It is an object of the present invention to provide a reliable sferics direction finder which is immune to the particular propagational phenomena responsible for bearing errors previously observed.

Another object of the invention is to provide a means for accurately reproducing the waveform of atmospherics originating in lightning discharges.

A further object of the invention is to improve the accuracy of the system by eliminating the error due to variation of the observed time intervals produced by the delay between the radiation components propagated along the surface of the earth and the components having undergone multiple reflections between the ionosphere and the surface of the earth.

A further feature is to provide an oscilloscope brightening circuit which is so arranged that signals of one polarity are displayed with proper sense, while signals of the opposite polarity produces a distinctive display to be interpreted as the reciprocal bearing of that particular trace.

These and other features and objects of our invention will become more apparent from a reading of the following description in connection with the drawings included herewith, wherein.

Certain types of meterological conditions are accompanied by severe electrical disturbances. It is recognized that electrical discharges generally occur in the upper atmosphere and that the presence of these discharges may be determined at a remote point because of the electromagnetic energy that is radiated from such a discharge. The disclosed direction finding system accurately measures the direction from an observer to an electrical discharge. If two or more such observations are made, the position of the discharge may be determined by triangulation methods.

Numerous tests have indicated that bearing errors previously encountered were due to polarization effects of ionosheric return waves. Since only the ionospheric returns are abnormally polarized, directional observations based solely on ground wave measurements are substantially free from abnormal polarization effects. This invention is based on the characteristic time difference occurring between the time of arrival of the ground pulse and the ionospheric reflections. Since the ionospheric reflections traverse longer propagational paths, on the assumption that the velocity of propagation of electromagnetic effects is essentially the same for all paths, the ground-propagated pulse should arrive first, followed by a series of ionopsheric returns. Ground-wave observations not contaminated by ionospheric returns cannot be achieved with previous direction finders. This is due to the low speed-of-response (low rate-of-rise of amplifier output voltages) associated with the existing deflection amplifiers brought about by the use of narrow bandwidths. Consequently by the time the amplified signal voltages applied to the deflecting plates are large enough to bring about a useful deflection on the screen of the cathode ray tube, the ground-propagated signal and the ionospheric-returned signals will have become superimposed. Under such circumstances, angular resolution on a time basis is impossible. Our invention utilizes the initial portion of the ground wave which avoids the error due to ionopshere reflections. Due to the small time interval by which the first skywave signal lags the ground wave, the deflection amplifiers must exhibit an extraordinary high speed-of-response. As a corollary, ground-wave observations uncontaminated by ionospheric returns with previous direction finders cannot be achieved due to the narrow pass-band and resulting low speed-of-response of the amplifiers employed.

Figure 1:
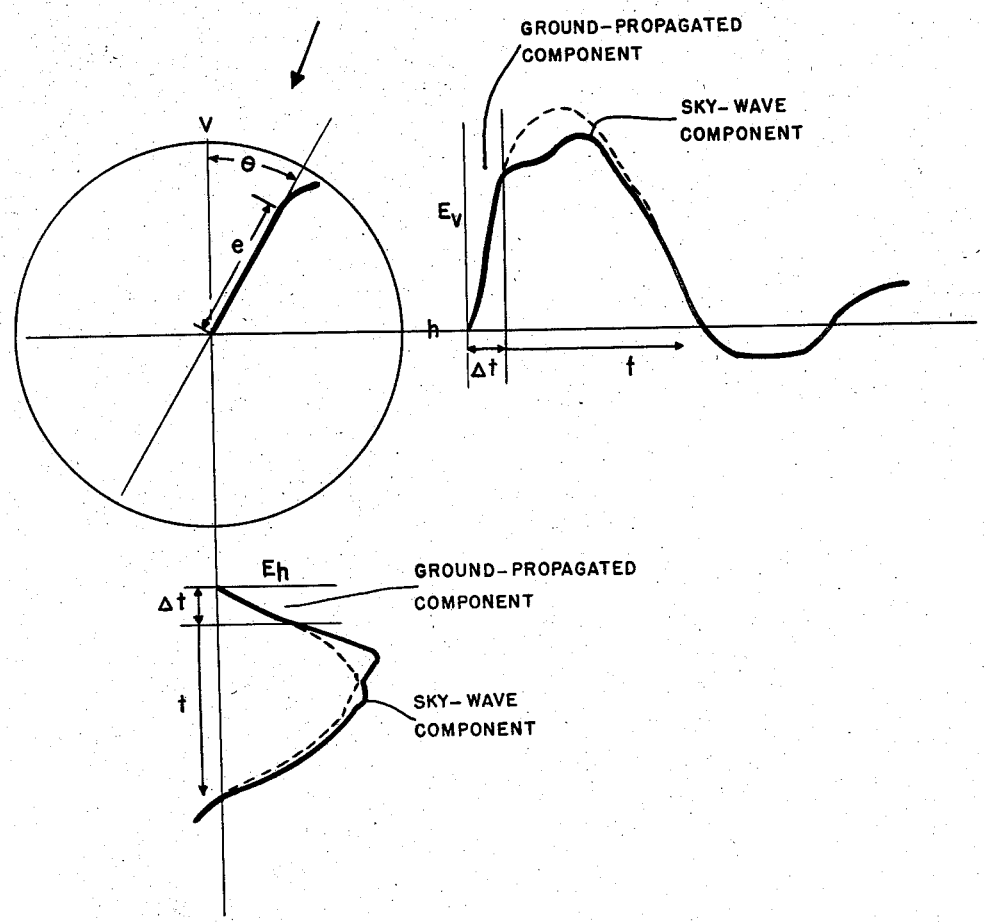
Fig. 1 is a series of curves showing the bearing indication on a cathode ray tube due to the leading edge of an atmospheric signal.

Fig. 1 illustrates the angular trace displayed on the screen of the indicating tube due to the mutually perpendicular deflection signals. The time interval $\Delta t$ represents the period before the arrival of the first-order ionospheric reflection, which alters the relative magnitudes of the deflection signals and hence the bearing indication. The use of two matched deflection amplifiers, each displaying negligible distortion characteristics brought about by a wide and flat frequency response as well as linear phase response, will develop signal voltages at the deflection plates of the CRT which are faithful reproductions of the atmospheric wave forms. Since the shape of the leading edge of this wave form is determined by the ground-propagated component it is clear that if the slope of the trace, or angle, is measured at the origin or center of the tube instead of at the extremities as previously, it is possible to obtain a bearing on the ground wave only. The return of the electron beam through the origin or center of the tube when the signal voltages change polarity may be sufficiently confusing to necessitate the use of brilliance-modulation techniques to prevent visual retrace. A suitable brilliance-modulation circuit is employed in this invention to intensify the cathode-ray trace during the $\Delta t$ time period.

This system is designed to provide directional displays comprising only the first few microseconds of each individual atmospheric. By employing only that portion of the received signal occurring before a sky-wave component can be received, accurate bearings should be displayed as illustrated by the linear portion $e$ of the trace represented in Fig. 1.

Figure 2:
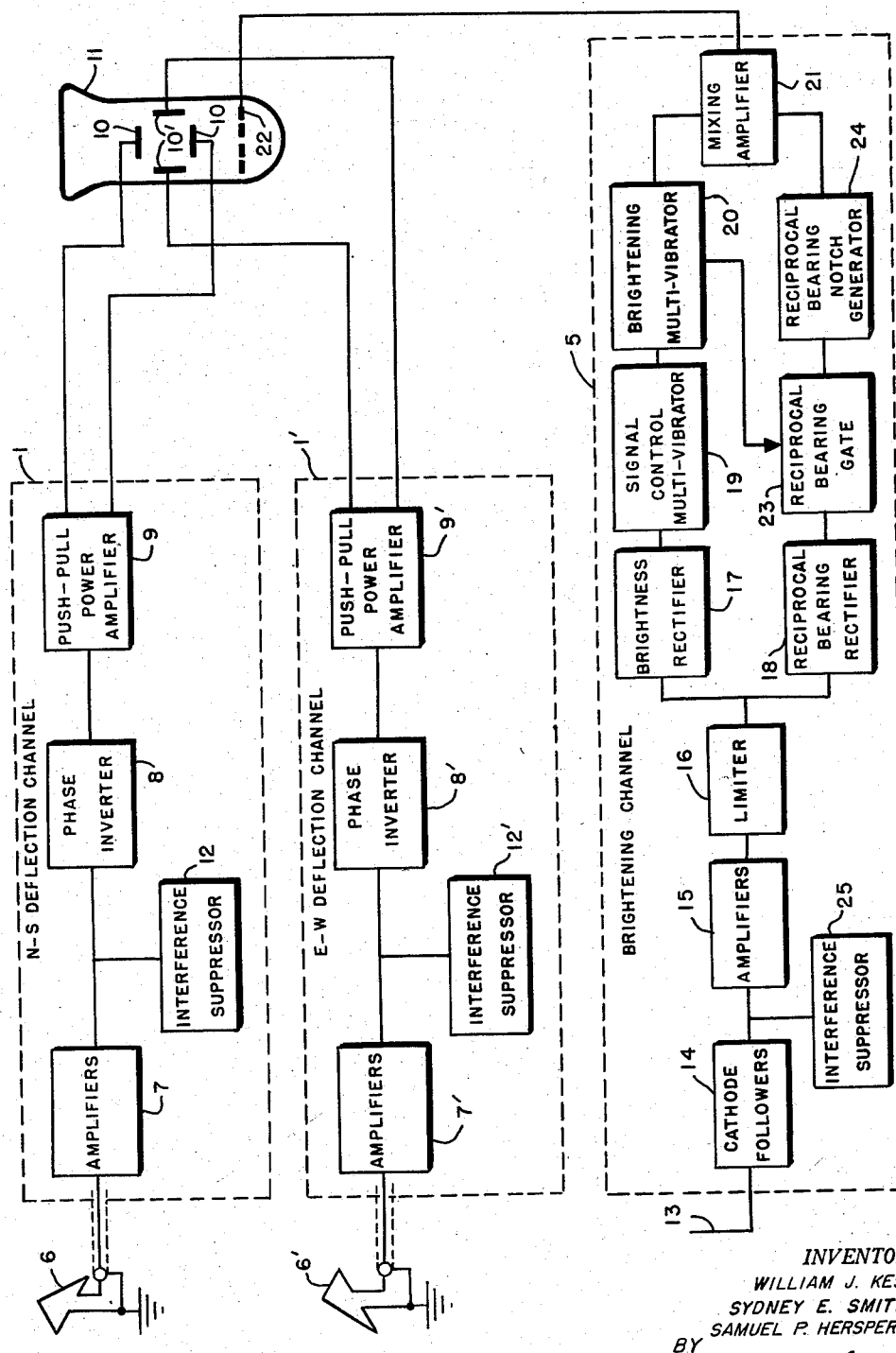
Fig. 2 is a block diagram illustrating the direction finding apparatus in accordance with the invention.

Referring to Fig. 2, there is shown schematically loop antennas 6—6' for receiving the north-south and east-west components of the sferics signals. The loop antennas and coupling circuits must exhibit sufficiently good transient response to prevent undue distortion of the leading edges of the received signals. Each loop antenna is coupled to a deflection amplifier network which includes amplifiers 7—7', phase inverters 8—8' and push-pull power amplifiers 9—9'. The power amplifiers are connected to deflection plates 10—10' of a cathode-ray tube indicator tube 11. Since the final indicating device 11 requires voltages that are in phase and that have the same relative magnitudes as the loop output voltages, it is necessary that the two amplifiers have identical amplification characteristics, both as regards amplitude and phase of ouput voltage as a function of frequency. Interference suppressors 12—12' may be included in each of the channels to permit attenuation of narrow bands within the pass band of the apparatus to eliminate interference due to continuous wave transmitters. A disturbance picked up by the north-south antenna is amplified and applied to one set of deflection plates and in a like manner the disturbance picked up by the east-west antenna is applied to the other set of deflection plates. The resultant pattern on the cathode-ray tube is an indication of the direction of the disturbance.

Since only the leading edge of the waveform is to be displayed, brightening channel 5 is utilized to increase the intensity of the cathode-ray tube during this period. Vertical antenna 13 receives the disturbance signal which is applied to amplifiers 15 from cathode follower 14. The signal is clipped by limiter 16 and applied to the brightness control and reciprocal bearing branches through rectifiers 17 and 18. An additional interference suppressor 25 might also be included in this circuit. The output of full-wave rectifier 17 is applied to trigger the control multi-vibrator 19 which in turn triggers brightening generator 20. The brightening generator has been designed to supply a preselected positive pulse of 25, 50, or 75 microseconds duration to the mixing amplifier 21, the output of which, a positive pulse, is applied to the control grid 22 of the cathode-ray tube 11. In this manner the intensity of the cathode ray tube is increased during the leading edge of the received pulse. Since the rise time of the deflection channels 1—1' is considerably greater than that of the sense-brightening channel practically the entire excursion of the electron beam from the center of the cathode ray tube occurs during the brightening interval. The action described above occurs regardless of whether the indicated bearing is true or reciprocal. Sensing is inherent in the crossed-loop antenna when operating on unidirectional pulse type signals provided the signals are always of the same polarity. Signals of reversed polarity produce reciprocal azimuth indications. To overcome this source of possible error, the following channel is provided to indicate reception of a signal of inverse polarity. This channel produces a dotted display which provides positive identification of reciprocal bearings, whether viewed directly or recorded photographically. The half-wave rectifier 18 is employed as a sense element for positively or negatively initiated signals, i.e. for true or reciprocal indicated bearings. When the initial pulse of the signal is of the polarity which is to provide the reciprocal indication, the signal is passed to the reciprocal bearing gate 23. Coincidence of this signal with a pulse from the controlled multivibrator 20 in the gate develops a signal which triggers the reciprocal bearing notching generator 24. This generator develops a clamped wave train of the order of 400 kc./s. which is clipped and mixed with the brightening pulse from 20 in such a manner as to "notch" the brightening signal to produce the dotted display. This circuit operates by virtue of the fact that the polarity of the voltage delivered by the antenna 13 is independent of the azimuth and is determined solely by the polarity of the incident electromagnetic field. It is arranged so that only signals exhibiting an initial alternation of polarity determined to display the reciprocal bearing will trigger the notching generator. In the brightening channel 5 of Fig. 2 the upper path shown schematically by blocks 17, 19, 20 are shown in the circuit arrangement of Fig. 3 by tubes 121, 122—123—124, and 125—126 respectively. The function of blocks 18, 23 and 24 in the lower path is performed by tubes 128, 129—130—131 and 132—133 respectively, in Fig. 3. The mixing amplifier 21 of Fig. 2 is shown by tube 127 in Fig. 3.

Figure 3:
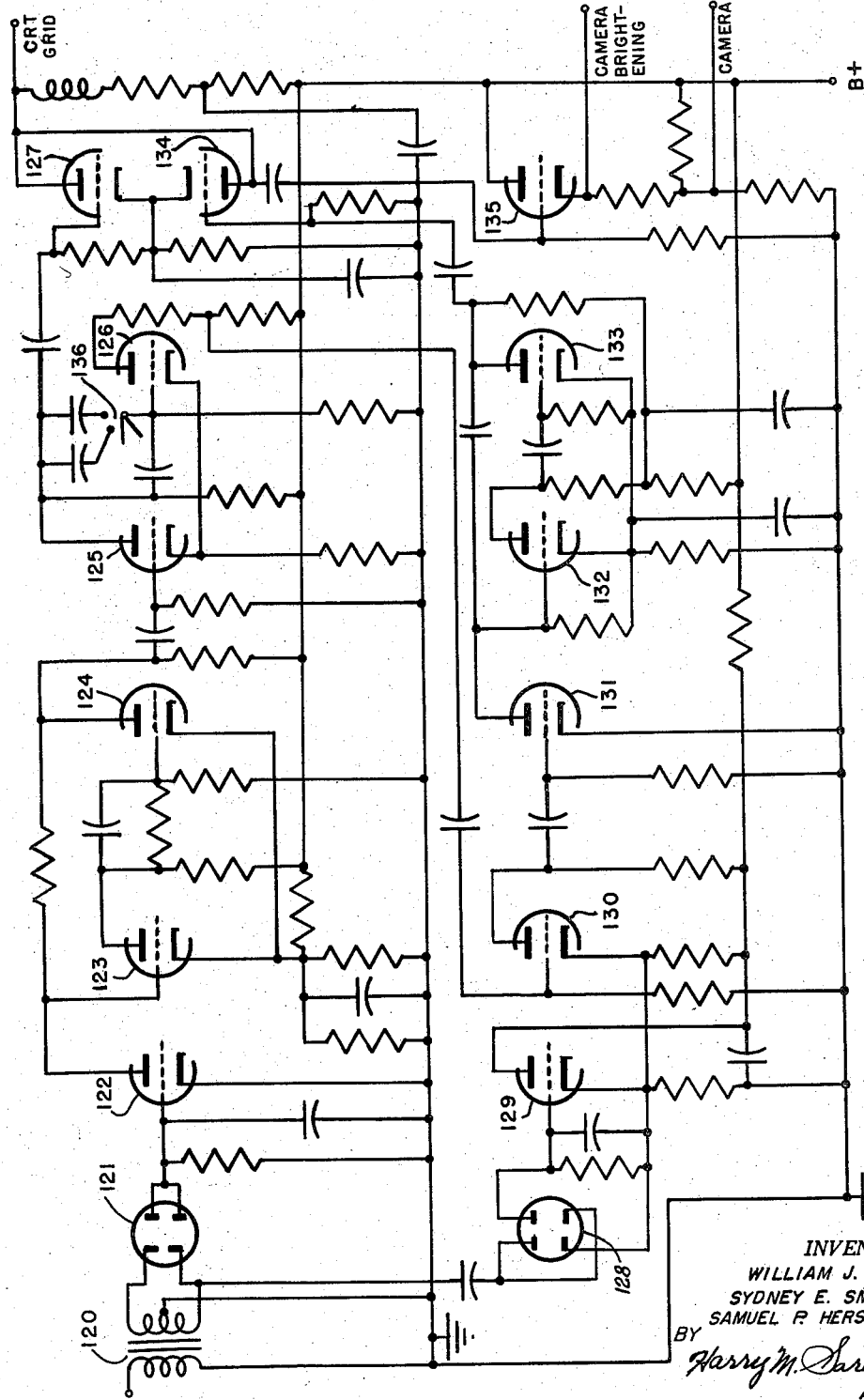
Fig. 3 shows the circuit diagram of the sense brightening channel indicated as block 5 in Fig. 2.

Referring to Fig. 3, the upper channel controls the intensity of the cathode ray tube for the predetermined time period while the lower channel produces the distinctive pattern to indicate polarity reversal of the received signal. The input signal from limiter 16 of Fig. 2 is applied to the 1:1 coupling transformer 120 where the signal is then rectified in full wave rectifier tube 121. The rectified signal is applied to multivibrator control tube 122 which triggers the control multivibrator composed of tubes 123—124. This control multivibrator in turn triggers mono-stable multivibrator 125—126 which determines the brightness period as selected by the setting of switch 136. The output of multivibrator 125—126 is coupled to amplifier-mixer tube 127, the output of which is applied to the intensity grid of the cathode ray tube. The signal from the secondary of the transformer 120 is also supplied to the reciprocal bearing channel including half wave rectifier 128 which is connected in such a manner that a negative leading pulse in coincidence with a pulse from the plate of brightness multivibrator 126 through the coupling capacitor to the grid of gate tube 130 would actuate the gate tubes 129—130 to trigger reciprocal bearing control tube 131 and notch multivibrator tubes 132—133. The output from multivibrator 132—133 is mixed with the upper channel in tube 134. Tube 135 might be utilized to energize photographic recording apparatus when required.

It will be obvious to those skilled in the art that various other changes and modifications may be made therein without departing from the invention, for example, a circuit may be made responsive to but one polarity of the signal. Should this circuit be used, a switch might be provided to change polarity at the option of the operator.

It is, therefore, aimed in the appended claims, to cover all such changes and modifications as fall within the true spirit and scope of the invention.

We claim:

1. An atmospherics ground pulse direction finder comprising a pair of wide-band deflection amplifiers for separately amplifying each component of a ground pulse; a cathode ray oscilloscope having deflecting means coupled to each of said amplifiers for displaying each of said components on a perpendicular axis; a third wide-band amplifier connected to antenna means for receiving said ground pulse; a limiter coupled to said third amplifier; a cathode ray oscilloscope intensity controlling branch connected to said limiter and comprising a full wave rectifier, a period determining multivibrator and a mixer connected in that order to the intensity grid of said cathode ray oscilloscope; a reciprocal indicating branch connected to said limiter and consisting of a half wave rectifier, a gating generator and a notch multivibrator in that order; the output of said notch multivibrator applied to said mixer; means interconnecting said period multivibrator and said gate generator, whereby reception of said ground pulse will trigger said period multivibrator to intensify the cathode ray beam for a pre-determined period, while reception of a pulse of reciprocal polarity will trigger said gate generator and said notch multivibrator to produce a dotted trace on said cathode ray tube.

2. An atmospheric discharge direction finding apparatus comprising a pair of antennas each oriented to receive a component of said discharge; a separate wide-band deflection amplifier coupled to each antenna; a cathode ray indicator having perpendicular deflection means connected to each amplifier; a cathode ray intensity controlling channel including an auxiliary antenna, amplifying means connected to said auxiliary antenna, a branch circuit having a period determining means, a full wave rectifier connected between said amplifying means and said period determining means, mixing means connected to said period determining means and to said cathode ray indicator thereby intensifying the cathode ray beam only during the initial portion of said disturbance, a reciprocal indicating branch having a half wave rectifier connected to said amplifying means, a gating circuit and a notch generator connected between said half wave rectifier and said mixing means, a connection between said period determining means and said gating circuit said branch producing a dotted display upon reception of a reciprocal bearing.

References Cited in the file of this patent

UNITED STATES PATENTS

| | | |
|---|---|---|
| 2,186,867 | Jeffcock | Jan. 9, 1940 |
| 2,213,273 | Earp | Sept. 3, 1940 |
| 2,380,929 | Akier et al. | Aug. 7, 1945 |
| 2,422,122 | Norton | June 10, 1947 |
| 2,812,472 | Welliver | Nov. 5, 1957 |

FOREIGN PATENTS

| | | |
|---|---|---|
| 474,690 | Great Britain | Nov. 5, 1937 |